United States Patent
Woida-O'Brien (10) Patent No.: US 9,163,903 B2
(45) Date of Patent: Oct. 20, 2015

(54) FIELD BORESIGHTING USING HOLOGRAPHIC LASER PROJECTION

(75) Inventor: Rigel Quinn Woida-O'Brien, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 613 days.

(21) Appl. No.: 13/604,934

(22) Filed: Sep. 6, 2012

(65) Prior Publication Data

US 2015/0198418 A1 Jul. 16, 2015

(51) Int. Cl.
*F41G 1/00* (2006.01)
*F41G 1/54* (2006.01)
*G03H 1/00* (2006.01)
*G03H 1/08* (2006.01)

(52) U.S. Cl.
CPC .............. *F41G 1/545* (2013.01); *G03H 1/0005* (2013.01); *G03H 1/08* (2013.01); *G03H 2222/12* (2013.01)

(58) Field of Classification Search
CPC ............. F41G 1/38; F41G 1/473; F41G 1/08; F41G 1/06; F41G 3/08
USPC .................................................. 42/111–148
See application file for complete search history.

(56) References Cited

U.S. PATENT DOCUMENTS

| | | | |
|---|---|---|---|
| 4,569,591 A | 2/1986 | Ford et al. | |
| 5,283,689 A * | 2/1994 | Carlough | 359/427 |
| 5,483,362 A * | 1/1996 | Tai et al. | 359/1 |
| 6,450,816 B1 | 9/2002 | Gerber | |
| 6,490,060 B1 | 12/2002 | Tai et al. | |
| 6,604,315 B1 * | 8/2003 | Smith et al. | 42/112 |
| 7,325,354 B2 | 2/2008 | Grauslys et al. | |
| D586,874 S | 2/2009 | Moody et al. | |
| 7,530,192 B2 | 5/2009 | Grauslys et al. | |
| 7,753,549 B2 | 7/2010 | Solinsky et al. | |
| 8,006,395 B2 * | 8/2011 | Kingsbury | 33/265 |
| 2005/0057808 A1 * | 3/2005 | Houde-Walter | 359/566 |
| 2005/0241210 A1 * | 11/2005 | Karcher et al. | 42/119 |
| 2006/0092517 A1 | 5/2006 | Maehara | |
| 2007/0044364 A1 * | 3/2007 | Sammut et al. | 42/122 |
| 2009/0051989 A1 * | 2/2009 | Dobschal et al. | 359/15 |
| 2009/0217565 A1 * | 9/2009 | Ford | 42/114 |
| 2013/0000172 A1 * | 1/2013 | Ford | 42/70.01 |
| 2014/0373424 A1 * | 12/2014 | Silvers et al. | 42/122 |

* cited by examiner

*Primary Examiner* — Samir Abdosh
(74) *Attorney, Agent, or Firm* — Lando & Anastasi, LLP (57) ABSTRACT

Systems and methods for boresighting a weapon having a barrel and at least one component to be aligned with the barrel. In one example, a boresighting apparatus includes a housing configured to attach to the weapon so as to lock the boresighting apparatus in a stationary position relative to the barrel, and a holographic laser projector contained within the housing and configured to project an image, the image including at least one boresighting target, each boresighting target of the at least one boresighting target having a geometric shape selected according to a component of the at least one component so as to permit alignment of the component with the barrel.

25 Claims, 10 Drawing Sheets

FIELD BORESIGHTING USING HOLOGRAPHIC LASER PROJECTION

BACKGROUND

Typical boresighting kits for weapons, such as the Shoulder-launched Multipurpose Assault Weapon (SMAW) portable rocket launcher, include bulky equipment, thereby making these kits impractical or inconvenient for field boresighting. For example, a current implementation of a boresighting kit for the SMAW weighs more than 70 pounds and involves bulky equipment including a tripod, a target board and a transfer slug. In using this kit, the SMAW is mounted to the tripod, which weighs about 45 pounds, to hold the system steady. A target reference pattern is printed on the target board, which is positioned some distance from the weapon. The transfer slug is placed in the barrel and fired toward a location on the target reference pattern. A great deal of complexity is built into the boresighting kit components to make them stable enough to be used together, thereby increasing the cost of the kit. The separation of the unit under test, for example the SMAW, from the target board further adds cost and complexity due to additional interfaces that must be provided to couple them in a steady configuration to permit reasonably accurate boresighting. Various components of the boresighting kit are often provided by different suppliers, further increasing cost.

Another disadvantage associated with traditional boresighting kits and boresighting methods is that relatively long alignment distances are required. For example, a traditional boresighting kit for a SMAW requires an alignment distance of 25 meters, and a traditional boresighting kit for an M1A1 tank requires setting up a target at an alignment distance of 1200 meters from the tank. However, alignment at long distances may be impractical in the field. Another disadvantage of using these kits for boresighting is the time, difficulty and the error inherent when aligning subsystems of the weapon to a target that is not physically coupled to the weapon, as discussed above. The difficulty of aligning the target with the weapon and maintaining this alignment is particularly challenging at longer alignment distances.

SUMMARY OF INVENTION

Boresighting of a gun or other weapon having a barrel can benefit from a lightweight and low-cost boresighting kit that may be easily deployed and used in the field. Traditional boresighting kits are not lightweight enough, nor inexpensive enough, and therefore do not meet the low cost and low mass requirements for widespread field deployment. Furthermore, while traditional boresighting kits may include visible targets, they do not include thermal targets, such as targets in an infrared (IR) spectrum range. However, weapon systems often include components or subsystems that operate in an infrared range, such as a thermal weapon sight. Therefore, traditional boresighting kits cannot be used to boresight components operating in an infrared range, and cannot be used to conveniently boresight multiple types of components, some of which operate in an infrared range.

Aspects and embodiments address the limitations identified above and may provide low-cost and lightweight field boresighting or "dry zeroing" systems that can be attached to a weapon and that can project target images in both visible and infrared ranges. Embodiments may provide a single apparatus that can attach directly to the weapon, thereby removing the need for multiple-component, bulky boresighting equipment. Embodiments of the boresighting apparatus include a holographic laser projector to project images including targets for boresighting different types of components of the weapon, as discussed further below. Other aspects and embodiments provide holographic laser projection systems that can project infrared images, and also provide methods of manufacturing and using the same. Embodiments may also provide multispectral holographic laser projectors for field boresighting various components that operate in different spectral ranges.

According to one aspect, a boresighting apparatus for boresighting a weapon having a barrel and at least one component to be aligned with the barrel may be provided. The boresighting apparatus may include a housing configured to attach to the weapon so as to lock the boresighting apparatus in a stationary position relative to the barrel, and a holographic laser projector contained within the housing and configured to project an image, the image including at least one boresighting target. Each boresighting target of the at least one boresighting target may have a geometric shape selected according to a component of the at least one component to be aligned with the barrel so as to permit alignment of the component with the barrel.

In some embodiments, the weapon may include a plurality of components to be boresighted, and the image may include a corresponding plurality of boresighting targets. Each boresighting target may be associated with a corresponding one of the plurality of components. In various embodiments, the plurality of boresighting targets may include a visible target and an infrared target. In some examples, the plurality of components may include an aiming system for the weapon, having at least one of an iron sight, an optical scope, a thermal weapon sight, a night vision system and a laser range finder. The weapon may be one of a shoulder-launched multi-purpose assault weapon (SMAW) and a tank and the housing may further include an interface to attach the boresighting apparatus to the barrel of one of the SMAW and the tank. In some embodiments, the housing may be configured to be at least partially inserted into the barrel of the weapon and the holographic laser projector may be configured to project the image through the barrel.

In some embodiments, the holographic laser projector may include a laser source configured to generate a laser beam and a holographic medium encoded with a diffraction pattern illuminated by the laser beam. The diffraction pattern may be configured to diffract the laser beam so as to construct the image. In one example, the diffraction pattern may be a computer generated hologram (CGH).

In some embodiments, the housing may further include a range selector coupled to the holographic laser projector. The range selector may be configured to allow selecting an alignment distance at which the image is in focus. The alignment distance may be measured from the weapon. In one example, the weapon may be a shoulder-launched multipurpose assault weapon (SMAW) and the alignment distance may be in a range of approximately 2.5 to 10 meters. In another example, the weapon may be a tank and the alignment distance may be in a range of approximately 25 to 50 meters.

According to another aspect, a method of field boresighting a weapon having a barrel and at least one component to be aligned with the barrel is provided. In one embodiment, the method comprises acts of attaching a boresighting apparatus having a holographic laser projector to the barrel; projecting an image from the holographic laser projector to an alignment distance in front of the weapon; and aligning the at least one component with the barrel using the image. In some embodiments, attaching the boresighting apparatus to the barrel may include locking the boresighting apparatus in a stationary position relative to the barrel. In some embodiments, attaching the boresighting apparatus may include attaching the boresighting apparatus to the barrel of one of a shoulder-launched multi-purpose assault weapon (SMAW), a tank, a rifle, a missile, a launcher, a machine gun and a weapon mounted on a vehicle.

In some embodiments, the at least one component may include a plurality of components and projecting the image may include projecting the image having a corresponding plurality of boresighting targets. An arrangement of the plurality of boresighting targets in the image may correspond to an arrangement of the components with respect to the barrel. Aligning each component may further include aligning each component with a respective boresighting target. In some embodiments, projecting the image may include selecting a wavelength range of the image; and operating a laser source to produce a laser beam having a wavelength within the wavelength range.

In some embodiments, aligning the at least one component may include aligning an aiming system of the weapon, wherein the aiming system includes at least one of an iron sight, an optical scope, a thermal weapon sight, a night vision system and a laser range finder. In some embodiments, attaching the boresighting apparatus may include at least partially inserting the boresighting apparatus into the barrel, and projecting the image may include projecting the image through the barrel. In some examples, projecting the image may include defining an input image, providing a diffraction pattern corresponding to the input image, generating a laser beam, and constructing the image by illuminating the diffraction pattern with the laser beam, the image being a reconstruction of the input image. In some embodiments, the method may further include selecting an alignment distance, and projecting the image may include projecting and focusing the image to the alignment distance.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to providing a lightweight and low cost field boresighting apparatus and method of manufacturing and using the same. Low cost and low mass are achieved by providing a single apparatus configured to attach to a barrel of a weapon and to project a target image from the weapon to a surface positioned at an alignment distance, as discussed further below. Securing the boresighting apparatus directly to the weapon and projecting the target image(s) eliminates the need for a traditional tripod and a printed target board and the complexity associated with aligning the printed target board with the tripod. Furthermore, attaching the boresighting apparatus to the weapon ensures that the projected target image and the weapon motion are linked, thereby providing a field boresighting system and method that are fairly insensitive to vibration or other disturbances of the weapon. Embodiments of the field boresighting apparatus include a holographic laser projector configured to project an image having target features for boresighting various components of the weapon, as discussed in detail below.

Other aspects and embodiments are directed to providing a holographic laser projector that can project infrared images. Projecting infrared images may include projecting images in near infrared (NIR), short wavelength infrared (SWIR), mid wavelength infrared (MWIR) and/or long wavelength infrared (LWIR) ranges. In some embodiments, the holographic laser projector may project images including both visible and infrared features as discussed further below. In other embodiments, the holographic laser projector may project images including features in other ranges of the electromagnetic spectrum. Aspects and embodiments are also directed to methods of assembling and operating the infrared holographic laser projector, as discussed below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
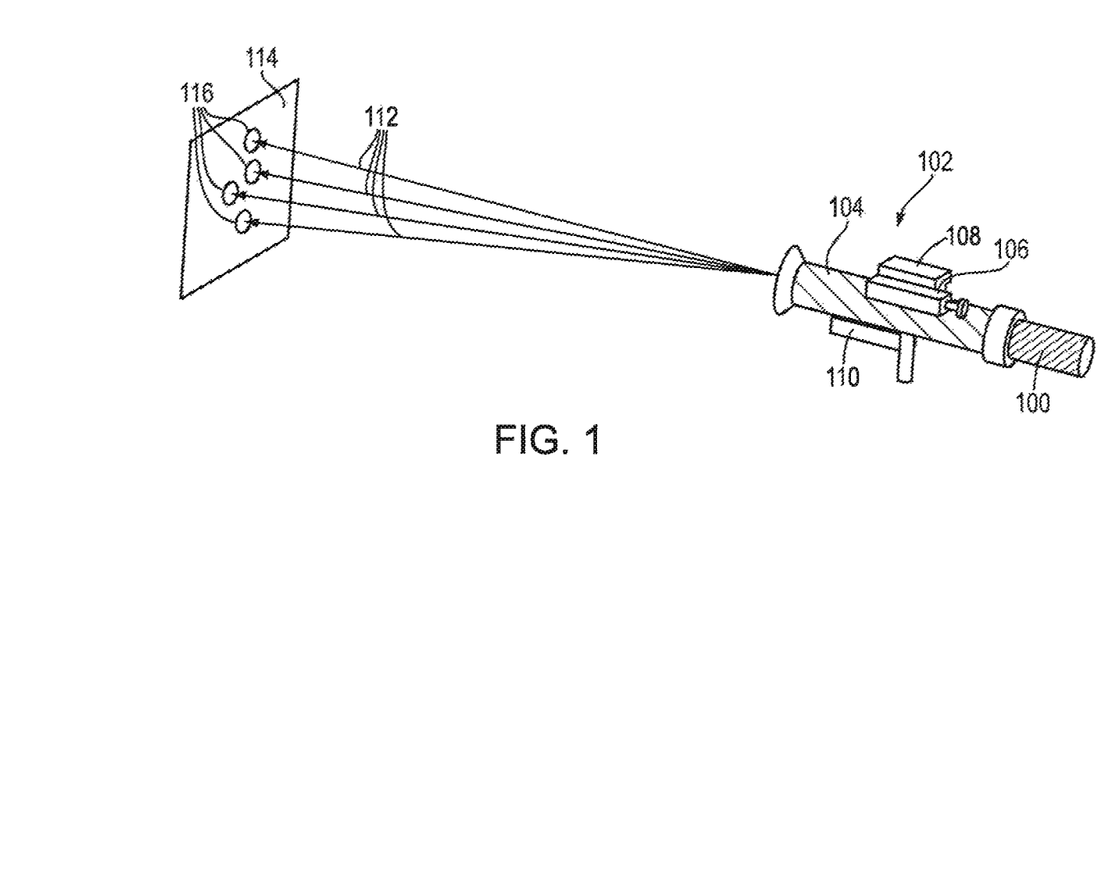
FIG. 1 is a perspective view illustrating one example of a field boresighting apparatus attached to the barrel of a weapon and projecting an image according to aspects of the present invention.

Referring to FIG. 1, there is illustrated one example of a boresighting apparatus 100 which may be used for field boresighting a weapon 102, according to one embodiment. The weapon has a barrel 104 and a plurality of components, including for example, an iron sight 106, a thermal weapon sight 108 and a laser range finder 110. The thermal weapon sight 108 operates in an infrared wavelength range. In other embodiments, the weapon 102 may include other types of components or subsystems. In the example illustrated in FIG. 1, the boresighting apparatus 100 is partially inserted into the barrel 104. In other embodiments, the boresighting apparatus 100 may be completely inserted into the barrel or otherwise attached to the weapon. The boresighting apparatus 100 may further include a lock to secure the apparatus to the weapon 102. In the example illustrated in FIG. 1, the weapon 102 is a portable rocket launcher; however, aspects and embodiments disclosed herein may provide systems and methods for field boresighting or alignment of a wide variety of weapons, including for example, rifles, rocket launchers, grenade launchers, missiles, tanks, and launch tubes. Other applications may include field boresighting or alignment of reconnaissance systems to plane or helicopter airframes, and multi-mode sensors on any weapon system. The term alignment as used herein is not limited to parallel alignment and may include other configurations of components of the weapon.

The boresighting apparatus 100 includes a holographic laser projector (as discussed further below and shown in FIG. 4) configured to project at least one laser beam through or alongside the barrel 104, as illustrated by lines 112, onto a surface located some distance from the weapon 102, to construct an image 114 on the surface. In one example, the image 114 is a two dimensional image including one or more targets 116. Each target 116 may correspond to a respective component of the weapon 102 to be used to boresight that component. The various components to be boresighted may be physically distributed at different locations on the weapon relative to the barrel 104. Accordingly, the holographic laser projector may be configured to project targets 116 that are distributed in a corresponding arrangement, such that boresighting is achieved by aligning a respective component with a respective target, as discussed further below. The image 114 may include a single target 116 or a plurality of targets. In FIG. 1, the targets 116 are shown to have identical geometric shapes which are circular. However, the targets 116 may have other geometric shapes and each target 116 may have a distinct geometric shape to facilitate alignment of a respective component of the weapon with that target, as discussed further below.

Figure 2:
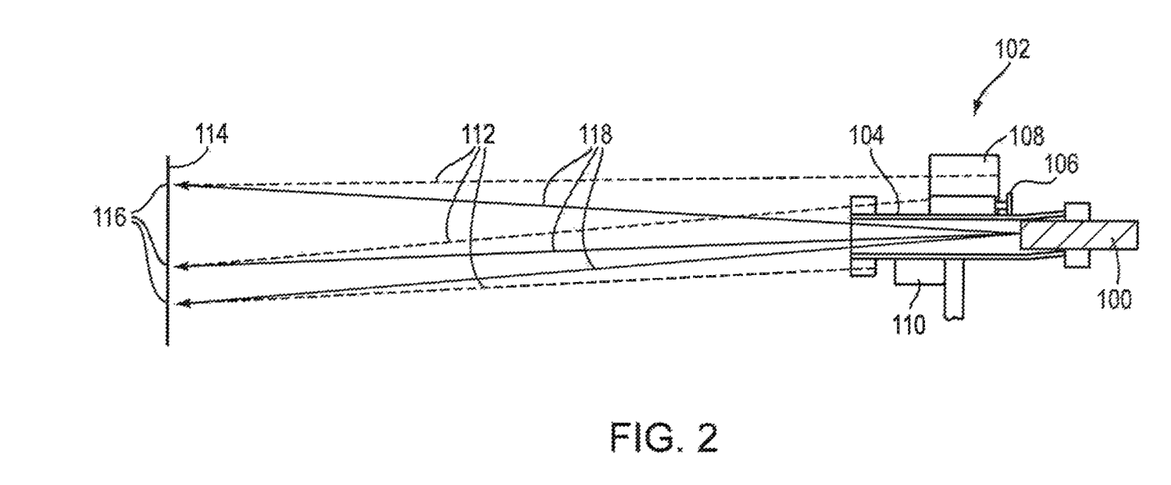
FIG. 2 is a cross-sectional side view of the example of FIG. 1, further illustrating, using dashed lines, alignment of components with respective targets in the image according to aspects of the present invention.

FIG. 2 is a cross-sectional side view of the boresighting apparatus 100 of FIG. 1, further illustrating, by dashed lines 118, alignment of each of the components 106, 108 and 110 of the weapon 102 with a corresponding one of the plurality of targets 116 in the image 114.

Figure 3:
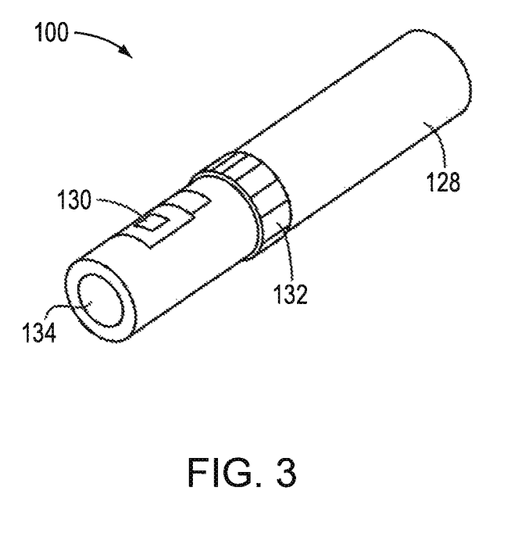
FIG. 3 is a perspective view of the field boresighting apparatus of FIG. 1, further illustrating an interface configured to attach to the barrel according to aspects of the present invention.

FIG. 3 is a perspective view of an example of the boresighting apparatus 100 of FIG. 1. The boresighting apparatus 100 includes a housing 128. In the example illustrated in FIG. 3, the housing 128 is cylindrical. The cylindrical form permits inserting the boresighting apparatus 100 into the cylindrical barrel 104 as shown in FIG. 1. In other embodiments, the housing 128 may have other forms. For example, the housing 128 may be a rectangular enclosure or may have an irregular or non-geometric form. As shown in FIG. 3, the boresighting apparatus 100 includes an interface 130 to connect the apparatus 100 to the weapon 102. The interface 130 may provide an electrical connection to the boresighting apparatus 100. The interface 130 may also provide a mechanical lock to secure the boresighting apparatus 100 to the weapon 102. In one example, the apparatus 100 further includes a range selector 132 to permit selecting an alignment distance, as discussed further below. The alignment distance refers to the distance at which the image 114 is projected from the weapon 102. The boresighting apparatus 100 further includes an aperture 134 configured to permit transmission therethrough of at least one laser beam generated by at least one laser source disposed within the boresighting apparatus 100.

Figure 4:
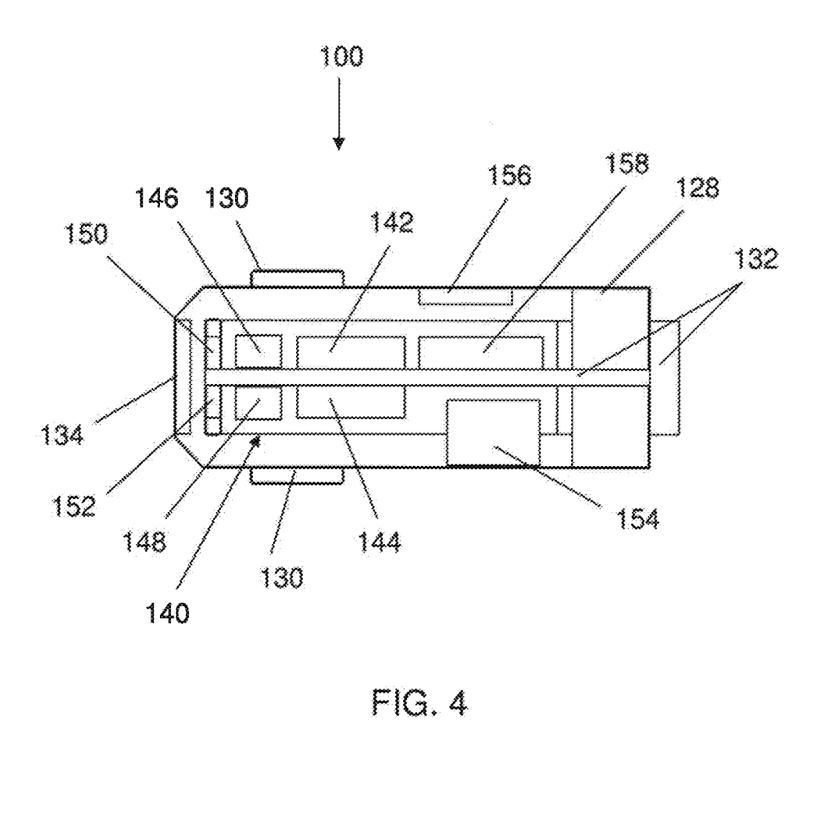
FIG. 4 is a block diagram of one example of a field boresighting apparatus including a holographic laser projector according to aspects of the present invention.

FIG. 4 is a block diagram of one embodiment of the boresighting apparatus 100, including the housing 128, the interface 130 configured to connect the apparatus to the weapon 102, the range selector 132 and the aperture 134 as described above with reference to FIG. 3. As discussed above, the apparatus 100 includes a holographic laser projector 140 configured to produce the image 114. The holographic projector 140 may include one or more laser sources that emit laser beams of particular wavelengths or in particular wavelength ranges. In one embodiment, the holographic laser projector 140 includes a first laser source 142 that is configured to generate a first laser beam having a wavelength in the infrared spectrum range, and a second laser source 144 configured to generate a second laser beam having a wavelength in the visible spectrum range. As such, the holographic projector 140 may generate a multi-spectral image 114 having both visible and infrared components. In other examples, the holographic projector 140 may be configured to produce the image 114 in one or more spectral ranges. As discussed further below, the holographic projector 140 includes one or more holographic media (e.g., holographic plates) that are configured to influence the laser beam(s) to produce the targets 116 in the image 114. Beam expanders 146 and 148 may be disposed in front of the first laser source 142 and the second laser source 148 respectively.

In one embodiment, the boresighting apparatus 100 further includes a power supply 154, such as a battery, for example, and a control panel 156 to provide controls to an operator. In one embodiment, the boresighting apparatus 100 further includes a test circuit 158 to test the health status and functionality of at least one component of the weapon to which the apparatus is connected. The test circuit 158 may test electronic circuits of the weapon. In one example, the test circuit 158 tests whether the weapon is safe to fire. The apparatus 100 may also provide a display of an output of the test circuit 158.

According to one embodiment, the holographic laser projector 140 includes a first holographic medium 150 optically coupled to the first laser source 142 and disposed in front of the beam expander 146. The holographic laser projector 140 may also include a second holographic medium 152 optically coupled to the second laser source 144 and disposed in front of the beam expander 148. In one example, the first holographic medium 150 has a transmittance range that includes the infrared wavelength image of the first laser source 142, and the second holographic medium 152 has a transmittance range that includes the visible wavelength range of the second laser source 144. Each of the first holographic medium 150 and the second holographic medium 152 may be one of silicon, germanium and Cleartran™, a water-free form of zinc sulfide. However, other suitable materials may also be used. In one example, the laser sources 142, 144 and each of the first holographic medium 150 and the second holographic medium 152 are disposed within the housing 128 such that the projected targets have a distribution that permits boresighting of respective components of the weapon.

In one embodiment, the boresighting apparatus 100 simultaneously projects both infrared and visible targets. In other embodiments, the holographic laser projector 140 may include only an infrared laser source to project an infrared image, or may include only a visible laser source to project a visible image. In yet other embodiments, a single laser source may be split into multiple beams to produce images at different wavelengths. Providing infrared boresighting targets may allow boresighting of components such as a thermal weapon sight that operate at infrared wavelengths and which cannot be boresighted using conventional boresighting kits with printed visible targets.

Thus, referring again to FIGS. 1 and 2, the holographic laser projector 140 is used to project the image 114 onto any reasonably flat, plain surface some distance in front of the weapon 102. In its simplest form, the image 114 may include a simple geometric shape, such as a cross, or circle (dot), or a cross-hair, for example, that can be used to boresight the sighting mechanism of the weapon. However, as discussed above, in some example, the weapon includes multiple components all of which may need to be boresighted. Accordingly, in one embodiment, the image 114 includes multiple targets 116 arranged and configured to permit boresighting of multiple components on the weapon 102 including, for example, a laser range-finder, a thermal weapon sight, a visible sighting device, such as iron sights or an optical sight, and the like.

Figure 5:
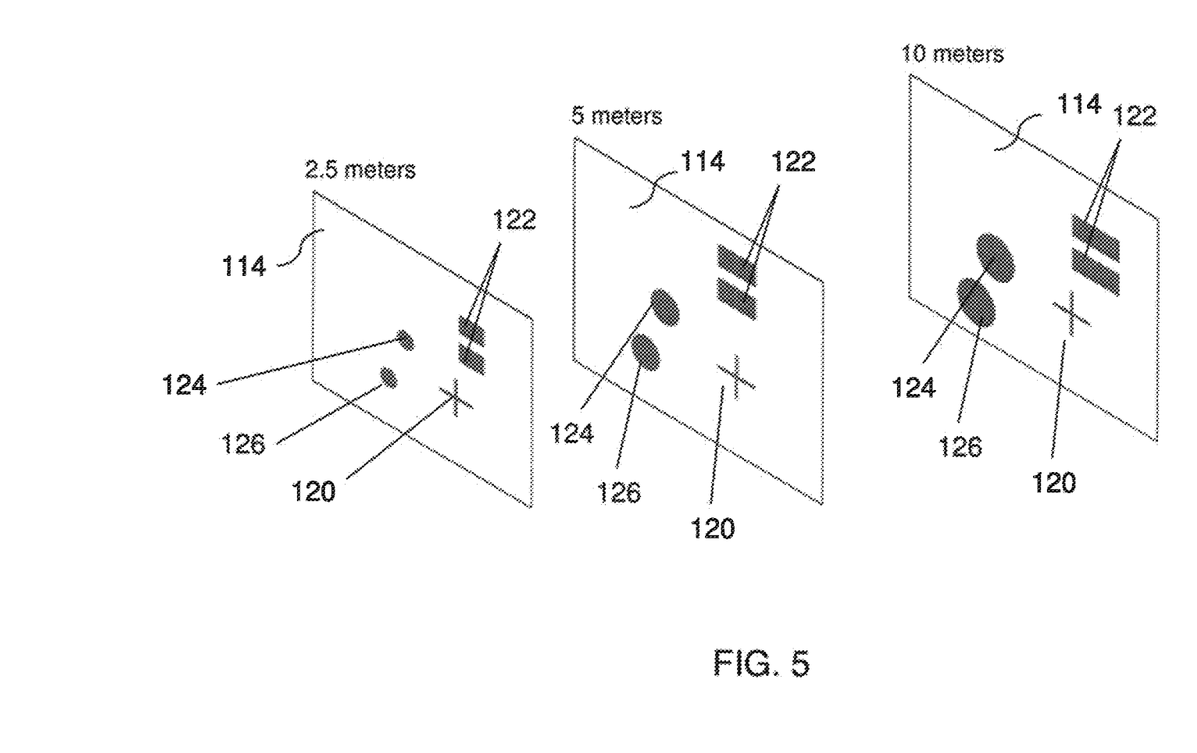
FIG. 5 is a perspective view showing one example of an image including a plurality of targets projected by the field boresighting apparatus of FIG. 1 to alignment distances of 2.5 meters, 5 meters and 10 meters, according to aspects of the present invention.

Referring to FIG. 5, there is illustrated one example of an image 114 projected by a holographic laser projector 140 of the boresighting apparatus 100, the image including a plurality of discrete targets 120, 122, 124 and 126. The image 114 is projected from the laser holographic projector, and may be displayed on any reasonably flat surface, such as a wall, for example, in front of the weapon. Holographic projection allows shaping a beam to create arbitrary geometric shapes on the flat surface, and also allows displacing and overlapping the projected geometric shapes. A laser source having a narrow spectral width may generally provide a good illumination source for holographic projection. In other embodiments, multiple lasers may be used to overlap the projected geometric shapes. As discussed above, the boresighting apparatus 100 may include a range selector 132 that allows a user to select an alignment distance. The image 114 may be in focus and may be correctly sized at the selected alignment distance, or distances very close to the selected alignment distance. In FIG. 5, the image 114 is illustrated at alignment distances of 2.5 meters, 5 meters and 10 meters. The accuracy or tolerance permitted in the boresighting procedure of the various components of the weapon 102 may dictate how closely the distance between the weapon 102 and the surface onto which the image 114 is projected should match the selected alignment distance. The alignment distance may be adjusted using the range selector 132 to adapt the boresighting apparatus 100 to conditions in the field such as, for example, availability of suitable projection surfaces and the ability to position the weapon in proximity to the surface.

In the example image 114 illustrated in FIG. 5, target 120 is cross shaped and corresponds to the boresight of the weapon 102. Target 122 includes two rectangular shapes for aligning the iron sight 106 of FIG. 1. Target 124 has a circular shape and corresponds to the thermal weapon sight 108 of FIG. 1. Furthermore, target 124 is in an infrared wavelength range that is within an operational wavelength range of the thermal weapon sight 108. Target 126 also has a circular shape and corresponds to the laser range finder 110 in FIG. 1. In one embodiment, each of the targets 120, 122 and 126 is a visible target, in contrast to the infrared target 124. Therefore, image 114 may include both visible and infrared targets. However, in other embodiments, the image 114 may include only visible targets or only infrared targets. In FIG. 5, the size of each of the targets 120, 122, 124 and 126 is shown to increase with alignment distance. In other embodiments, the holographic laser projector 140 may be configured to project an image having a different distribution and/or number of targets. As discussed above, the distribution of targets may correspond to an arrangement of components on the weapon. In one example, the image may include a target in the form of a grid to facilitate alignment of a respective component of the weapon. The target grid may be either a visible target or an infrared target.

According to one embodiment, the holographic laser projector 140 projects the image 114 and targets 116/120-126 by illuminating diffraction patterns formed on the holographic media that correspond to the desired targets. For example, referring again to FIG. 4, in one embodiment the first holographic medium 150 includes a first diffraction pattern (as shown in FIG. 9D and described below) corresponding to a target that is to be projected in a first wavelength range (e.g., an infrared wavelength range) through the boresighting apparatus 100. The second holographic medium 152 includes a second diffraction pattern corresponding to a target that is to be projected in a second wavelength range (e.g., a visible wavelength range) through the boresighting apparatus 100. The diffraction patterns correspond to input images or targets to be projected. When the diffraction pattern on the holographic medium is illuminated with a laser beam, the laser beam is diffracted as it transmits through the holographic medium, thereby constructing an image, wherein the image is a reconstruction of the input image or target. Each of the first and second diffraction patterns may be a computer generated hologram and each may be computed so as to produce a respective target having a predefined geometric shape to be projected for boresighting a respective component of a weapon to which the boresighting apparatus 100 is attached.

Referring to FIG. 4, in one example as the first laser beam illuminates the first holographic medium 150, the first laser beam is diffracted by the first diffraction pattern, thereby forming an infrared target within the projected image. In one example, the infrared target is target 124 in the projected image 114 of FIG. 5. Similarly, as the second laser beam illuminates the second holographic medium 152, the second laser beam is diffracted by the second diffraction pattern, thereby forming a visible target within the projected image. In one example, the visible target is target 122 in the projected image 114 of FIG. 3. Each laser beam may be transmitted through a respective holographic medium and diffraction pattern. Other embodiments may include a single holographic medium having diffraction patterns formed therein. The holographic medium may be illuminated by a single laser beam or multiple laser beams to construct an image including at least one boresighting target. In some embodiments, the holographic laser projector 140 may include a filter wheel to switch from a first holographic medium to a second holographic medium, each holographic medium having a corresponding diffraction pattern, thereby switching from projecting a first image to projecting a second image.

Embodiments of the boresighting apparatus disclosed herein provide several advantages over traditional boresighting kits. For example, the projected targets and weapon are coupled and fairly vibration insensitive. The apparatus is lightweight and less expensive than traditional kits. Complex targets are easily projected using holographic laser projection. Diffraction patterns (holograms) may be tuned to any wavelength a laser is available to illuminate them. The boresighting apparatus supports visible laser projection of targets, infrared laser projection of targets, as well as overlay of targets in distinct spectral bands. Furthermore, shorter alignment distances are achieved. In one example, an embodiment may be configured to project targets to alignment distances of 10 to 25 meters for boresighting the M1A1 tank, in contrast with the traditional alignment distance of 1200 meters.

Figure 6:
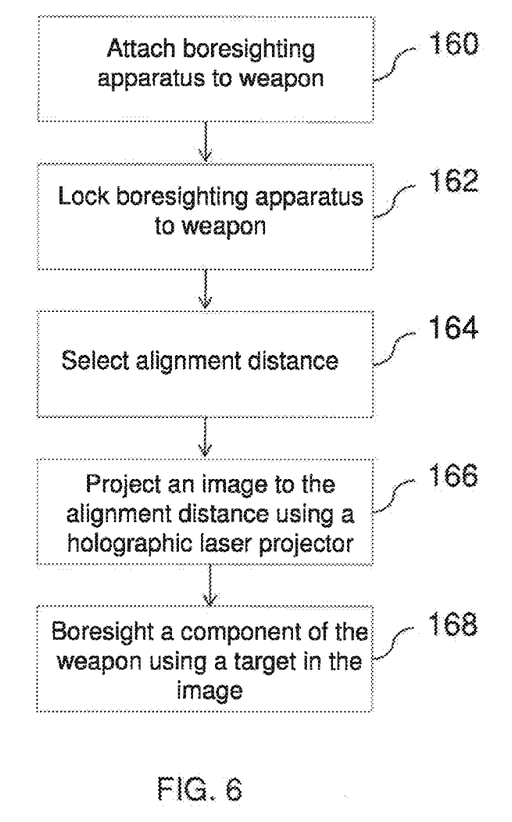
FIG. 6 is a flow chart of one example of a method of field boresighting, according to aspects of the present invention.

FIG. 6 is a flow chart of one example of a method of field boresighting a weapon, according to one embodiment. The method includes attaching a boresighting apparatus to the weapon (Step 160). In one example, the boresighting apparatus may be the apparatus shown in FIG. 4. Attaching the apparatus to the weapon may include inserting the apparatus partially into the barrel of the weapon. The method may further include locking the apparatus to the weapon (Step 162), such that the apparatus is secured in a stationary position with respect to the weapon. The method may include selecting an alignment distance (Step 164). In other embodiments, the alignment distance may be predetermined. The method includes projecting an image including boresighting targets to the alignment distance using a holographic laser projector (Step 166). In one embodiment, the holographic laser projector may be configured as the holographic laser projector 140 shown in FIG. 4, to project an image 114 including both infrared and visible targets, as shown in FIG. 5. The method includes boresighting at least one component of the weapon using a target in the image (Step 168). One embodiment of the boresighting method may include boresighting a thermal weapon sight using an infrared target in the image, and may further include boresighting iron sights using visible targets in the image.

Figure 7:
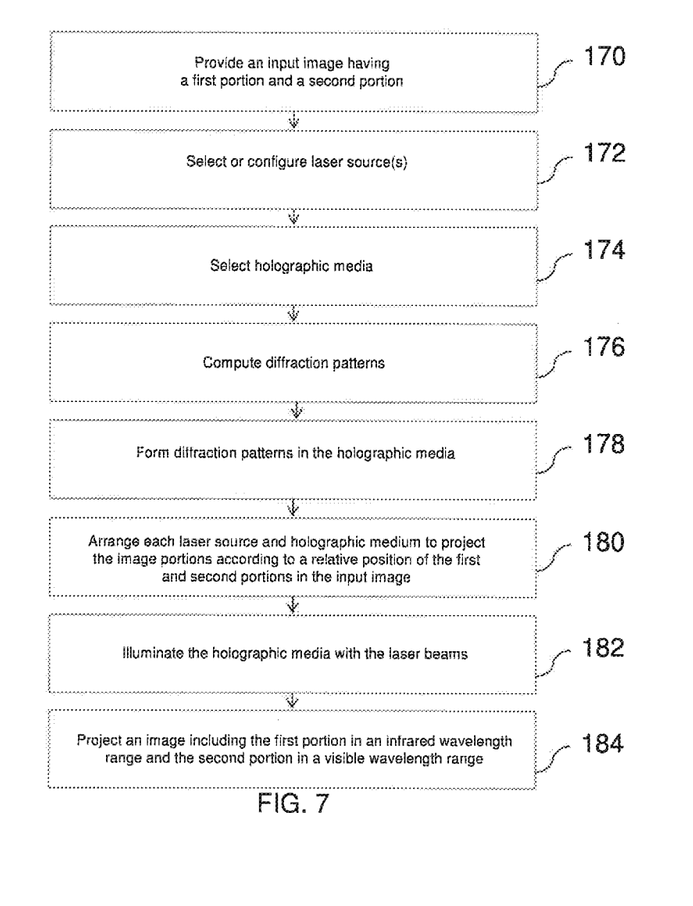
FIG. 7 is a flow chart of one example of a method of projecting an image using a holographic laser projector, according to aspects of the present invention.

FIG. 7 is a flow chart of another embodiment of a method of projecting an image including both infrared and visible portions, using a holographic laser projector according to aspects discussed herein. In one application, the holographic laser projector may be used for field boresighting a weapon as described above. However, embodiments are not limited to boresighting applications. In the embodiment shown in FIG. 7, the method of projecting an image includes providing an input image having a first portion and a second portion (Step 170). The first portion is desired to be projected in an infrared wavelength range, whereas the second portion is desired to be projected in a visible wavelength range. In one example, each of the first and second portions may be features or targets for field boresighting a weapon. Each of the first and second portions may have unique geometric shapes and may be positioned in the input image according a predetermined configuration. In one example, the relative configuration of target portions in the input image may be selected according to an arrangement of components of a weapon to be boresighted.

In one embodiment, the method includes selecting a first laser source to generate a first laser beam in an infrared wavelength and selecting a second laser source to generate a second laser beam in a visible wavelength (Step 172). In one example, step 172 includes selecting two different laser sources. In another example, step 172 includes configuring a single laser source to generate the laser beams in the visible and infrared wavelength ranges. The method includes selecting a first holographic medium having a transmittance range including the infrared wavelength of the first laser beam, and selecting a second holographic medium having a transmittance range including the visible wavelength of the second laser beam (Step 174). Each of the first holographic medium and the second holographic medium may be one of silicon, germanium and Cleartran™.

Still referring to FIG. 7, the method further includes computing a first diffraction pattern for the first portion of the input image according to the selection of the first laser source and the first holographic medium, and computing a second diffraction pattern for the second portion according to the selection of the second laser source and the second holographic medium (Step 176). The first diffraction pattern is then formed in the first holographic medium, and the second diffraction pattern is formed in the second holographic medium (Step 178). In one example, each of the first holographic medium and the second holographic medium is etched with a respective diffraction pattern. Each laser source and each holographic medium may be arranged to project each of the first and second image portions according to their relative positions in the input image (Step 180). The method further includes illuminating the first holographic medium with the first laser beam and illuminating the second holographic medium with the second laser beam (Step 182), thereby projecting an image to a distance (Step 184). The image is a reconstruction of the input image, including the first portion in an infrared wavelength range and the second portion in a visible wavelength range. The first portion and the second portion also have relative positions as provided in the input image.

It is to be appreciated that some of the steps shown in FIG. 7 may be performed in another order or may overlap. For example, in one embodiment, the first holographic medium and the second holographic medium may be selected prior to selecting a first laser source and a second laser source. In this embodiment, the first laser source may be selected to generate a first laser beam having an infrared wavelength within the transmittance range of the first holographic medium, and the second laser source may be selected to generate a second laser beam having a visible wavelength within the transmittance range of the second holographic medium.

Referring to both FIG. 4 and FIG. 7, in one embodiment, the method of projecting an image may include selecting the first laser source 142 and the second laser source 144 of FIG. 5 (Step 172 of FIG. 7). The method may include selecting the first holographic medium 150 and the second holographic medium 152 of FIG. 5 (Step 174 of FIG. 7). The method may also include arranging elements 142, 144, 150 and 152 as shown in FIG. 5 (Step 180 of FIG. 7) and illuminating each holographic medium with a respective laser beam (Step 182 of FIG. 7) to project an image 114 to a distance, as shown in FIG. 3. Image 114 may include a first portion (targets 120, 122 and 126 of FIG. 3) projected in a visible wavelength range and a second portion (target 124 of FIG. 3) projected in an infrared wavelength range.

In the embodiments described above in relation to FIGS. 4 and 7, the first laser source 142 and the second laser source 144 are different. In other embodiments, the first laser source and the second laser source may be the same. In some embodiments, the first holographic medium and the second holographic medium may be provided as a single integral part. Computing the first and second diffraction patterns for the first and second image portions, respectively, may involve computing a single diffraction pattern for the image including the first portion and the second portion. In other embodiments, computing a diffraction pattern for each of the first and second portions may further include computing a plurality of diffraction patterns for each of the first and second portions. Other embodiments may include projecting an image having only visible portions or having only infrared portions. Accordingly, these embodiments may include selecting only a single laser source and a single holographic medium having a diffraction pattern corresponding to the image. Projecting an image as described above in relation to FIG. 7 may be a step of a field boresighting method, such as Step 166 of FIG. 6.

Embodiments of holographic laser projectors and methods of projecting an image as disclosed herein may be used in a field boresighting apparatus to project an image having infrared targets. A holographic laser projector may be configured to project both visible and infrared targets for boresighting various components of a weapon. Other aspects are directed to providing methods of manufacturing a holographic laser projector to project images including infrared portions. As discussed above, the ability to project infrared target images may provide various benefits, including the ability to boresight a thermal weapon sight or other component that operates in the infrared wavelength range.

Figure 8:
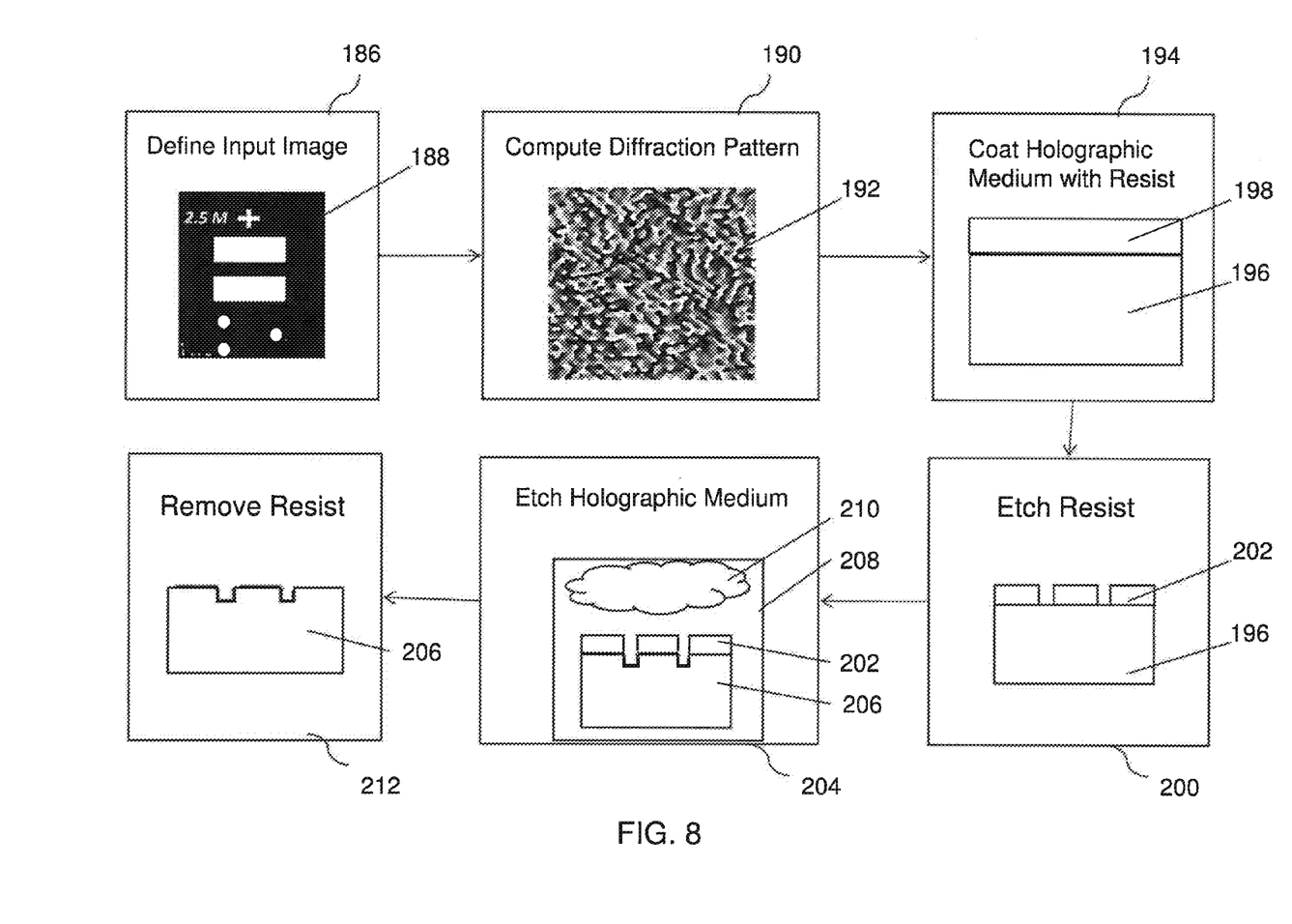
FIG. 8 is a flow chart of one example of a method including forming a diffraction pattern in a holographic medium, according to aspects of the present invention.

FIG. 8 is a flow chart of one embodiment of a method including forming a diffraction pattern on a holographic medium, wherein the holographic medium has a transmittance range including a wavelength in an infrared spectrum. The method includes defining an input image 188 (Step 186). As shown in FIG. 8, the input image 188 may include a plurality of targets for boresighting a weapon. The method includes computing a diffraction pattern (Step 190) corresponding to a portion of the input image to be projected in an infrared wavelength range. One example of a diffraction pattern 192 is shown in FIG. 8. The diffraction pattern 192 may be a computer generated hologram (CGH), and may be computed by any suitable algorithm for generating a diffraction pattern corresponding to at least a portion of the input image 188. As discussed above in relation to Step 176 of FIG. 7, the diffraction pattern may be computed for a given portion of the image and for a given holographic medium and a given wavelength of a laser beam that will illuminate the respective holographic medium, thereby diffracting the laser beam to construct the said portion of the image.

Still referring to FIG. 8, the method of forming the diffraction pattern 192 on the holographic medium 196 may include coating the holographic medium with a resist 198 (Step 194). In one example, the resist is a photoresist. The holographic medium may include silicon, germanium or Cleartran™, for example, or any other suitable material having an infrared transmittance range. In some embodiments, any common infrared glass material may be used. Forming the diffraction pattern 192 on the holographic medium 196 may further include etching the resist 198 to form a mask or resist 202 including the diffraction pattern 192. In one example, the method includes applying photolithography to form the diffraction pattern 192 on the resist 198. The method may also include etching the holographic medium 196 using the resist 202 (Step 204). Step 204 may include applying one of ion etching, wet etching or other suitable etching method. In the example illustrated in FIG. 8, the etched holographic medium 206 is formed by using the resist 202 as a mask and applying ion etching to the holographic medium 196 in chamber 208 containing plasma 210. The method may further include removing the resist 202 (Step 212), to provide a holographic medium 206 etched with the diffraction pattern 192. This holographic medium formed as disclosed herein may be provided in embodiments of the boresighting apparatus and embodiments of the infrared holographic laser projector disclosed herein (such as the embodiment of FIG. 5). Methods of forming a diffraction pattern on a holographic medium as disclosed herein may also be applied as one step of a method of projecting an image, such as in step 178 of the embodiment of FIG. 7.

Figure 9A:
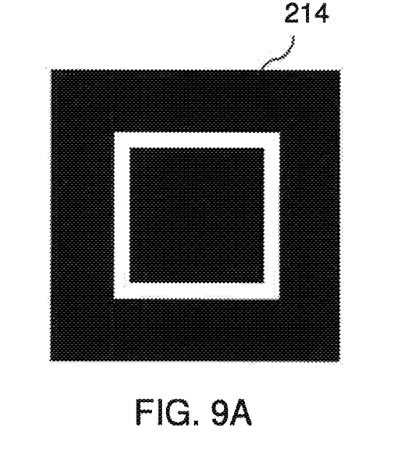
FIG. 9A illustrates one example of an input image including a square geometric shape, according to aspects of the present invention.
Figure 9B:
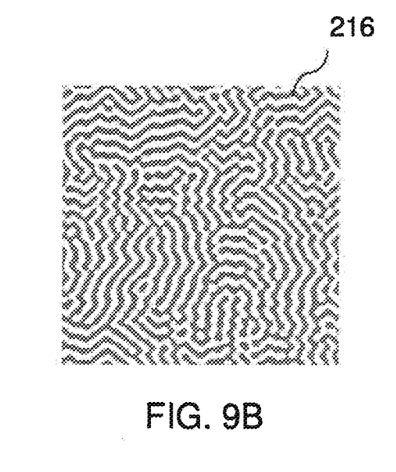
FIG. 9B illustrates one example of a diffraction pattern that corresponds to the square shape of FIG. 9A for etching at a depth of 1.06 microns in a germanium holographic medium and for projection using an infrared laser beam having a wavelength of 10.6 microns according to aspects of the present invention.
Figure 9C:
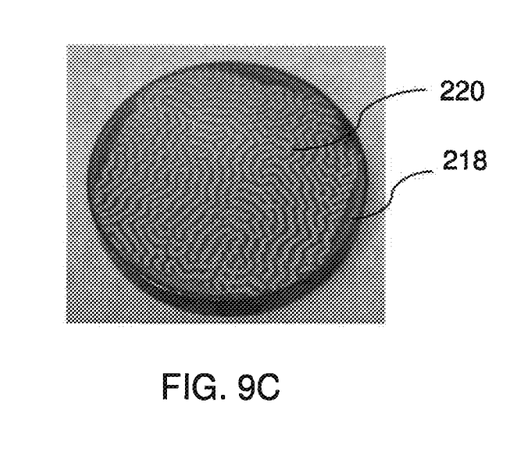
FIG. 9C is a perspective view of a germanium holographic medium coated with a resist, further illustrating the diffraction pattern of FIG. 9B formed on the resist, according to aspects of the present invention.
Figure 9D:
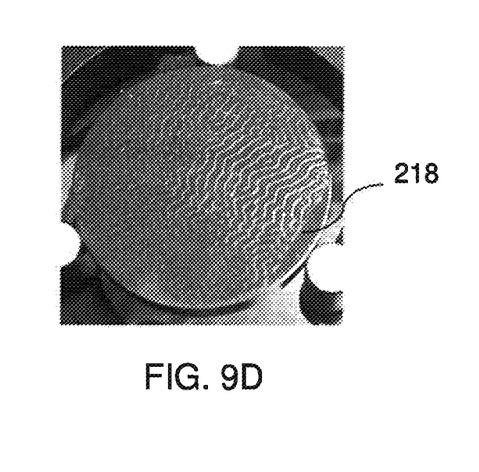
FIG. 9D is a perspective view of the holographic medium of FIG. 9C etched with the diffraction pattern of FIG. 9B, according to aspects of the present invention.

FIG. 9A illustrates one example of an input image 214 having a square shaped portion to be projected in an infrared wavelength range. FIG. 9B illustrates a corresponding diffraction pattern 216 generated for the square shaped portion of the input image 214. The diffraction pattern 216 is generated for etching at a depth of 1.06 microns in a germanium holographic medium and for projection using an infrared laser beam having a wavelength of 10.6 microns. It will be appreciated that the diffraction pattern may have a different appearance if generated for a different etching depth or wavelength. FIG. 9C is a perspective view of a germanium holographic medium provided in a circular plate 218 and coated with a resist 220 having the diffraction pattern 216 formed thereon. FIG. 9D is a perspective view of the holographic medium 218 without the resist, showing the holographic medium etched with the diffraction pattern 216. The holographic medium 218 of FIG. 9D may be included in an embodiment of a boresighting apparatus, similar to the first holographic medium 150 in FIG. 4, and may be used to project an image including the square shaped portion 214 in an infrared wavelength range.

Figure 10A:
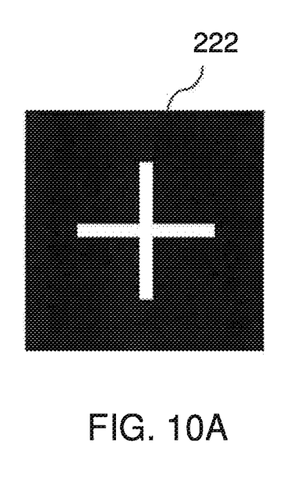
FIG. 10A illustrates one example of an input image including a cross shape, according to aspects of the present invention.
Figure 10B:
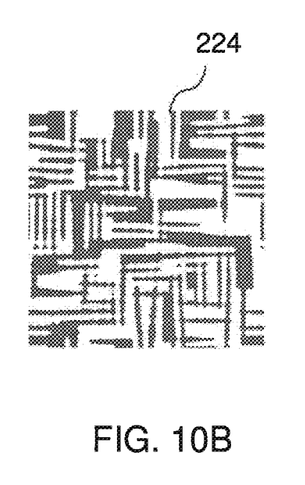
FIG. 10B illustrates one example of a diffraction pattern that corresponds to the cross shape of FIG. 10A for etching at a depth of 0.93 microns in a silicon holographic medium and for projection using an infrared laser beam having a wavelength of 8.3 microns, according to aspects of the present invention.
Figure 10C:
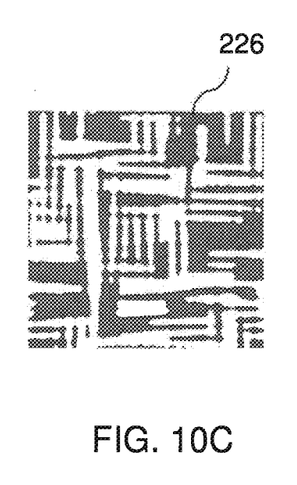
FIG. 10C illustrates one example of a diffraction pattern that corresponds to the cross shape of FIG. 10A for etching at a depth of 1.06 microns in a germanium holographic medium and for projection using an infrared laser beam having a wavelength of 10.6 microns, according to aspects of the present invention.
Figure 10D:
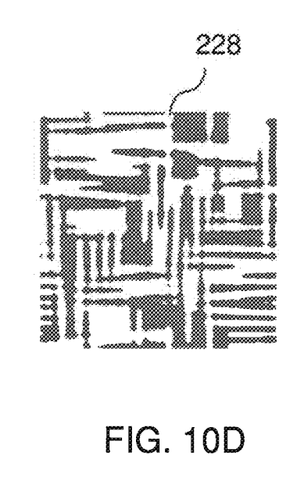
FIG. 10D illustrates one example of a diffraction pattern that corresponds to the cross shape of FIG. 10A for etching at a depth of 1.64 microns in a Cleartran™ holographic medium and for projection using an infrared laser beam having a wavelength of 10.6 microns, according to aspects of the present invention.

FIG. 10A illustrates another example of an input image 222 having a cross shaped portion to be projected in an infrared wavelength range. Each of FIGS. 10B, 10C and 10D illustrates a diffraction pattern 224, 226 and 228 computed for the input image 222. Each of the diffraction patterns 224, 226 and 228 is computed for a different holographic medium. For example, diffraction pattern 224 is for etching onto a germanium holographic medium at a depth of 1.06 microns and for projection using an infrared laser beam having a wavelength of 10.6 microns to reconstruct the cross shaped portion of the input image 222. Diffraction pattern 226 is for etching onto a silicon holographic medium at a depth of 0.93 microns and for projection using an infrared laser beam having a wavelength of 8.3 microns, to reconstruct the cross shaped portion of the input image 222. Diffraction pattern 228 is for etching onto a Cleartran™ holographic medium at a depth of 1.64 microns and for projection using an infrared laser beam having a wavelength of 10.6 microns, to reconstruct the cross shaped portion of the input image 222.

Diffraction patterns, such as those shown in FIG. 9 and FIG. 10, may be CGH. More specifically, the CGH patterns may one of binary CGH and grayscale CGH. A binary CGH includes areas that are exposed (for example white areas as shown in FIG. 9B) and areas that are not exposed (for example dark areas as shown in FIG. 9B). Therefore, a binary CGH corresponds to a single etching depth. In other embodiments, the CGH may be a grayscale CGH that corresponds to multiple layers of etching depths. In one example, a holographic medium may be etched based on a grayscale CGH to create up to 256 layers at different depths.

Embodiments of the holographic laser projector disclosed herein provide infrared and multi-spectral holographic laser projectors that permit projecting images including infrared portions. Embodiments also provide diffraction patterns and methods of forming a diffraction pattern in a holographic medium having infrared transmittance to permit projecting custom images in infrared. Embodiments of the holographic laser projector may be used in optical field boresighting systems and in methods of boresighting or alignment of various types of components disposed on a weapon having a barrel. In these embodiments, the projected image may be a boresighting target.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A boresighting apparatus for boresighting a weapon having a barrel and a plurality of components to be aligned with the barrel, the boresighting apparatus comprising:
   a housing configured to attach to the weapon so as to lock the boresighting apparatus in a stationary position relative to the barrel; and
   a holographic laser projector contained within the housing and configured to project an image, the image including a corresponding plurality of boresighting targets, each boresighting target of the plurality of boresighting targets being associated with a corresponding one of the plurality of components and having a geometric shape selected according to the component so as to permit alignment of the component with the barrel.

2. The boresighting apparatus of claim 1, wherein the plurality of boresighting targets includes a visible target and an infrared target.

3. The boresighting apparatus of claim 1, wherein the plurality of components includes an aiming system for the weapon, having at least one of an iron sight, an optical scope, a thermal weapon sight, a night vision system and a laser range finder.

4. The boresighting apparatus of claim 1, wherein the weapon is one of a shoulder-launched multi-purpose assault weapon (SMAW) and a tank, the housing further including an interface to attach the boresighting apparatus to the barrel of one of the SMAW and the tank.

5. The boresighting apparatus of claim 1, wherein the housing is configured to be at least partially inserted into the barrel of the weapon and wherein the holographic laser projector is configured to project the image through the barrel.

6. The boresighting apparatus of claim 1, wherein the holographic laser projector includes:
   a laser source configured to generate a laser beam; and
   a holographic medium encoded with a diffraction pattern illuminated by the laser beam, the diffraction pattern being configured to diffract the laser beam so as to construct the image.

7. The boresighting apparatus of claim 6, wherein the diffraction pattern is a computer generated hologram (CGH).

8. The boresighting apparatus of claim 1, wherein the housing further includes a range selector coupled to the holographic laser projector and configured to allow selecting an alignment distance at which the image is in focus, the alignment distance being measured from the weapon.

9. The boresighting apparatus of claim 8, wherein the weapon is a shoulder-launched multipurpose assault weapon (SMAW) and the alignment distance is in a range of 2.5 to 10 meters.

10. The boresighting apparatus of claim 8, wherein the weapon is a tank and the alignment distance is in a range of 25 to 50 meters.

11. A method of field boresighting a weapon having a barrel and at least one component to be aligned with the barrel, the method comprising:
   attaching a boresighting apparatus having a holographic laser projector to the barrel;
   projecting an image from the holographic laser projector to an alignment distance in front of the weapon; and
   aligning the at least one component with the barrel using the image;
   wherein projecting the image includes:
      selecting a wavelength range of the image; and
      operating a laser source to produce a laser beam having a wavelength within the wavelength range.

12. The method of claim 11, wherein attaching the boresighting apparatus includes locking the boresighting apparatus in a stationary position relative to the barrel.

13. The method of claim 11, wherein the at least one component includes a plurality of components, wherein projecting the image includes projecting the image having a corresponding plurality of boresighting targets, an arrangement of the plurality of boresighting targets in the image corresponding to an arrangement of the components with respect to the barrel; and
   wherein aligning each component further includes aligning each component with a respective boresighting target.

14. The method of claim 11, wherein attaching the boresighting apparatus includes attaching the boresighting apparatus to the barrel of one of a shoulder-launched multi-purpose assault weapon (SMAW), a tank, a rifle, a missile, a launcher, a machine gun and a weapon mounted on a vehicle.

15. The method of claim 11, wherein aligning the at least one component includes aligning an aiming system of the weapon, wherein the aiming system includes at least one of an iron sight, an optical scope, a thermal weapon sight, a night vision system and a laser range finder.

16. The method of claim 11, wherein attaching the boresighting apparatus includes at least partially inserting the boresighting apparatus into the barrel, and wherein projecting the image includes projecting the image through the barrel.

17. The method of claim 11, wherein projecting the image includes:
defining an input image;
providing a diffraction pattern corresponding to the input image;
generating a laser beam; and
constructing the image by illuminating the diffraction pattern with the laser beam, the image being a reconstruction of the input image.

18. The method of claim 11, further including selecting an alignment distance, and wherein projecting the image includes projecting and focusing the image to the alignment distance.

19. A boresighting apparatus for boresighting a weapon having a barrel and at least one component to be aligned with the barrel, the boresighting apparatus comprising:
a housing configured to attach to the weapon so as to lock the boresighting apparatus in a stationary position relative to the barrel, the housing being further configured to be at least partially inserted into the barrel; and
a holographic laser projector contained within the housing and configured to project an image through the barrel, the image including at least one boresighting target, each boresighting target of the at least one boresighting target having a geometric shape selected according to a component of the at least one component so as to permit alignment of the component with the barrel.

20. The boresighting apparatus of claim 19, wherein the holographic laser projector includes:
a laser source configured to generate a laser beam; and
a holographic medium encoded with a diffraction pattern illuminated by the laser beam, the diffraction pattern being configured to diffract the laser beam so as to construct the image.

21. The boresighting apparatus of claim 20, wherein the diffraction pattern is a computer generated hologram (CGH).

22. The boresighting apparatus of claim 19, wherein the weapon includes a plurality of components to be boresighted, and wherein the image includes a corresponding plurality of boresighting targets, each boresighting target being associated with a corresponding one of the plurality of components.

23. A method of field boresighting a weapon having a barrel and at least one component to be aligned with the barrel, the method comprising:
attaching a boresighting apparatus having a holographic laser projector to the barrel, including at least partially inserting the boresighting apparatus into the barrel;
projecting an image from the holographic laser projector through the barrel to an alignment distance in front of the weapon; and
aligning the at least one component with the barrel using the image.

24. The method of claim 23, wherein projecting the image includes:
selecting a wavelength range of the image; and
operating a laser source to produce a laser beam having a wavelength within the wavelength range.

25. The method of claim 23, wherein projecting the image includes:
defining an input image;
providing a diffraction pattern corresponding to the input image;
generating a laser beam; and
constructing the image by illuminating the diffraction pattern with the laser beam, the image being a reconstruction of the input image.

* * * * *